United States Patent [19]
Sebastian

[11] 3,830,608
[45] Aug. 20, 1974

[54] AUTOMATIC MACHINE FOR GREASING BAKERY PANS AND DEPOSITING BATTER THEREIN

[75] Inventor: Anthony Sebastian, Pittsburgh, Pa.
[73] Assignee: Mallet & Co., Inc., Carnegie, Pa.
[22] Filed: Dec. 30, 1971
[21] Appl. No.: 213,875

[52] U.S. Cl............... 425/103, 118/2, 118/319, 118/324, 425/261
[51] Int. Cl............................................. A21c 9/00
[58] Field of Search .......... 118/2, DIG. 8, 319, 324; 214/1 BV; 198/33 AD; 425/103, 261

[56] References Cited
UNITED STATES PATENTS

| | | | |
|---|---|---|---|
| 2,499,621 | 3/1950 | Archer........................... | 118/DIG. 8 |
| 2,747,539 | 5/1956 | Peffer.................................... | 118/2 |
| 2,811,130 | 10/1957 | Friderici.............................. | 118/2 |
| 2,912,169 | 11/1959 | Peffer, Jr.......................... | 118/2 X |
| 3,042,274 | 7/1962 | Freeman............................. | 118/2 X |
| 3,071,258 | 1/1963 | Seegh et al................. | 198/33 AD X |
| 3,246,625 | 4/1966 | Beaman................................. | 118/2 |
| 3,610,397 | 10/1971 | Bok.................................. | 198/33 AD |

Primary Examiner—John P. McIntosh
Attorney, Agent, or Firm—Brown, Murray, Flick & Peckham

[57] ABSTRACT

A bakery machine receives inverted multi-cavity bakery pans, turns them right side up, carries them beneath a pan greasing unit and then deposits batter in the pan cavities. The inverted pans are gripped by their ends and carried in a circular path in a vertical plane to turn them over. Grease is sprayed downwardly into the pans only when their cavities are beneath the grease nozzles. Measured amounts of batter are delivered at uniform intervals to the greased cavities.

10 Claims, 17 Drawing Figures

AUTOMATIC MACHINE FOR GREASING BAKERY PANS AND DEPOSITING BATTER THEREIN

Various apparatus has been proposed for automatically delivering dough or batter to bakery pans to produce bakery products. In the making of cupcakes and like small individual products or snack items, each pan is provided with two or more rows of cavities in which the batter is to be baked. Before the batter can be deposited in the pan it is necessary to coat the walls of the cavities with a depanning liquid or grease so that the baked products can easily be separated from the pan without sticking. Heretofore, the manner of applying the depanning grease has resulted in considerable waste and also in the grease being deposited not only in the pans but also on the equipment around and between them. The pans have generally been greased while bottom side up and then they had to be turned over to receive the batter, which has been another drawback.

It is among the objects of this invention to provide a machine which can receive bakery pans bottom side up from washing apparatus and then turn them right side up, which sprays grease downwardly and only into the pan cavities, which will not spray any grease between pans, which is readily adjustable for different size pans and different numbers of cavities per pan, and which deposits a measured amount of batter in every pan cavity before the pans leave the machine.

The preferred embodiment of the invention is illustrated in the accompanying drawings, in which.

Referring to FIGS. 1 to 4 of the drawings, the main frame of the machine has legs 1, from which sidewalls 2 extend upwardly. At the rear or entry end of the machine a conveyor has parallel conveyor link belts 3 extending around sprockets 4 mounted on shafts spaced lengthwise of the frame. The front shaft 6 is driven by a chain 7 and sprockets from a gear box 8 mounted on supports 9 and 10 in the frame below the conveyor. The gears in the gear box are driven by a shaft 12 extending forward to another gear box 13 that is mounted on a support 14 in the frame and driven by a chain 15 and sprockets from a transverse shaft 16. This shaft is driven by a chain 18 and sprockets from an electrically operated variable speed unit 19. A short distance in front of the conveyor just mentioned there is a second conveyor formed from parallel chains 21 extending around sprockets 22 on the transverse shaft 16, and sprockets 23 on a rear shaft 24. Mounted on each of these chains are longitudinally spaced flight bars 25 for engaging the rear edges of bakery pans 26, shown in FIGS. 16 and 17, each provided with a plurality of rows of cavities in which cupcakes or similar bakery products are to be baked. The two conveyors run continuously.

Figure 1:
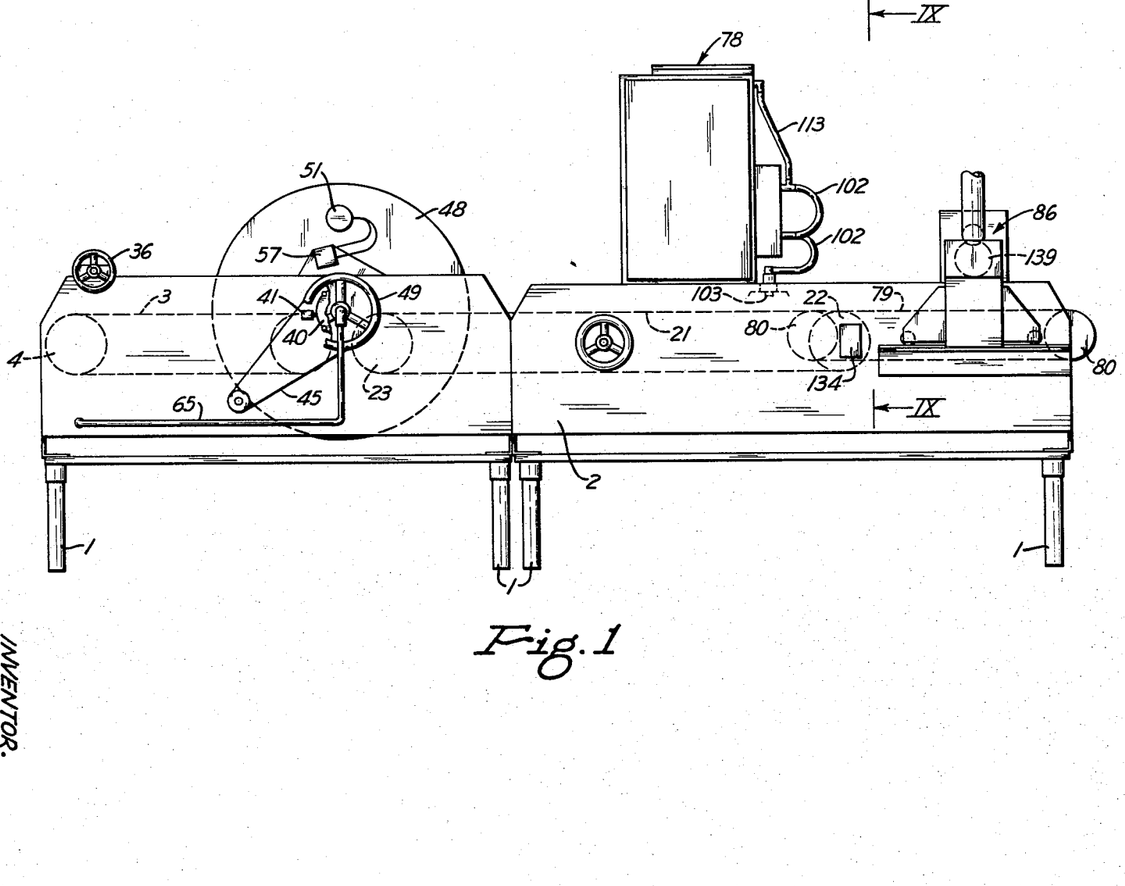
FIG. 1 is a side view of the machine showing its general outline.
Figure 5:
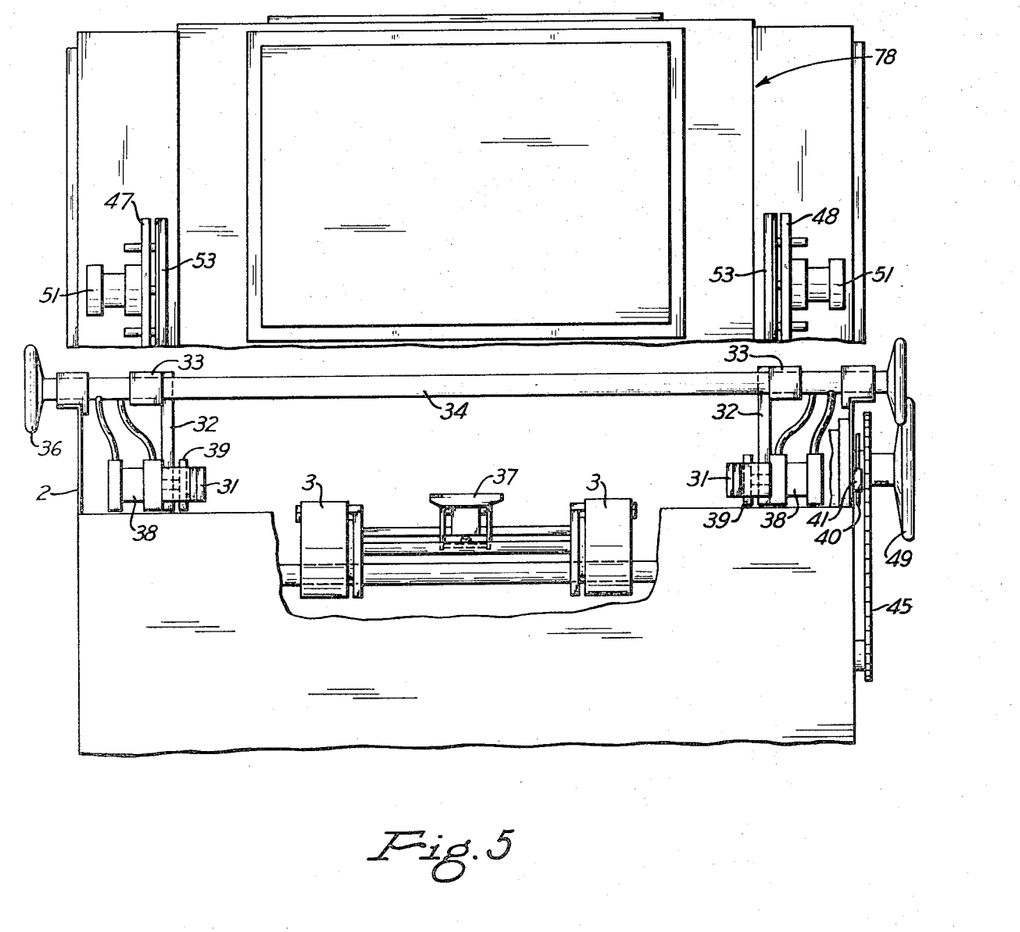
FIG. 5 is a view of the entering end of the machine.

The pans, after they have been washed, are fed bottom side up in any suitable manner to the rear conveyor. To center them on the conveyor they move forward between guides 31 (FIGS. 2 and 5) mounted on the lower ends of plates 32 supported by blocks 33 that are slidably mounted on a pair of hollow rods 34 extending across the machine and secured to the tops of its side walls. The rods are connected with a source of air pressure. Between these rods there is a rotatable shaft 35 provided with screw threads for adjusting the blocks and guides toward and away from each other when the shaft is turned by a handwheel 36 on either end. As the inverted pan is carried forward by conveyor 3 it depresses the trigger 37 of an air switch to admit air under pressure from one of the rods 34 to the outer ends of horizontal cylinders 38 carried by the plates 32 in front of the guides. This moves their pistons toward each other so that pads 39 on the free ends of the piston rods will engage the opposite ends of the pan and hold it at this station until a continuously rotating cam 40 operates an air valve 41 mounted on the side of the machine as shown in FIGS. 1 and 5 to reverse the cylinders and thereby release the pan. The pan then travels forward until it is arrested by a stop 42 at the front end of the rear conveyor.

Figure 6:
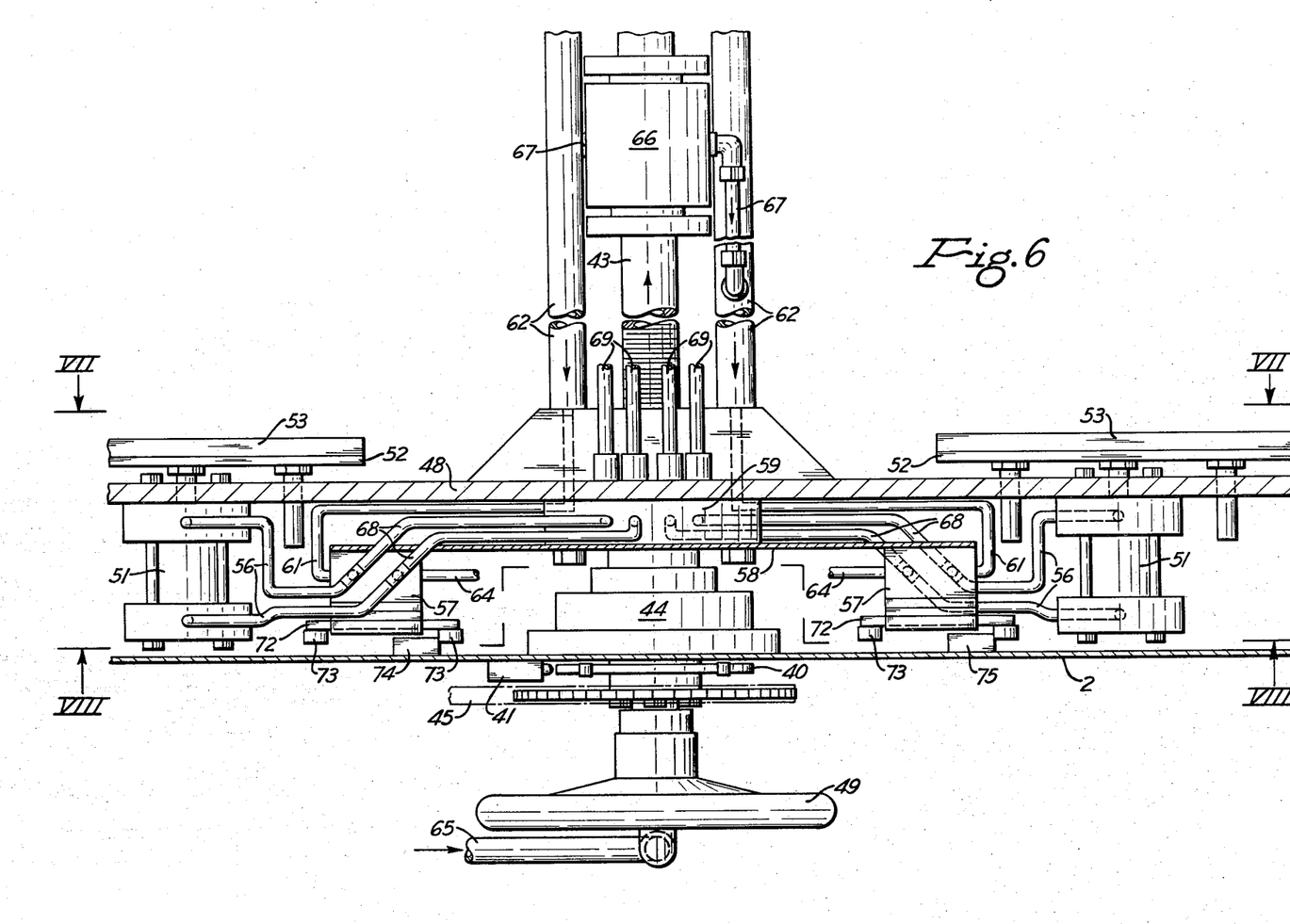
FIG. 6 is an enlarged fragmentary plan view of one end of the pan turnover mechanism, shown partly in section.
Figures 7, 8:
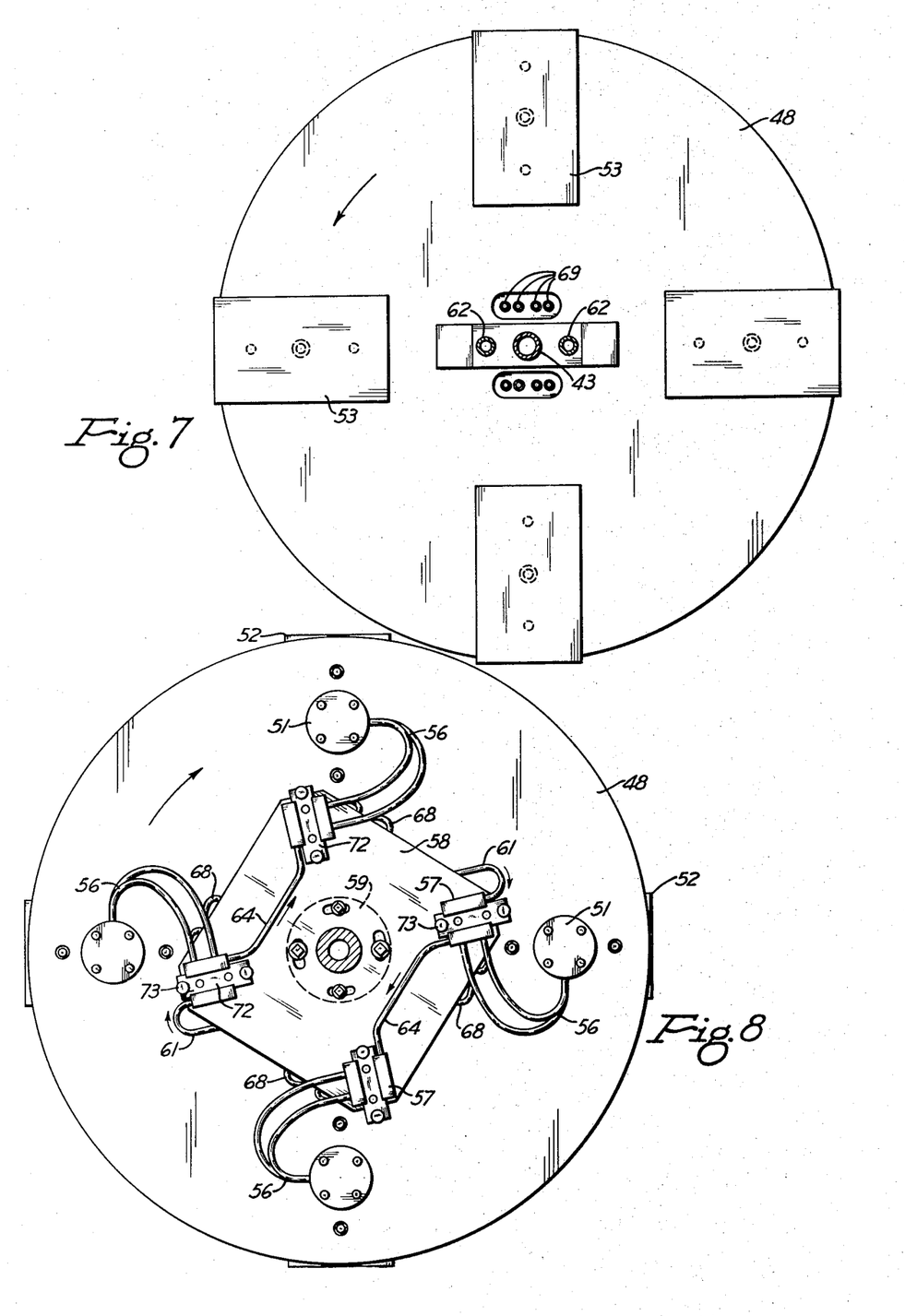
FIGS. 7 and 8 are reduced vertical views taken on the lines VII—VII and VIII—VIII, respectively, of FIG. 6.
Figure 16:
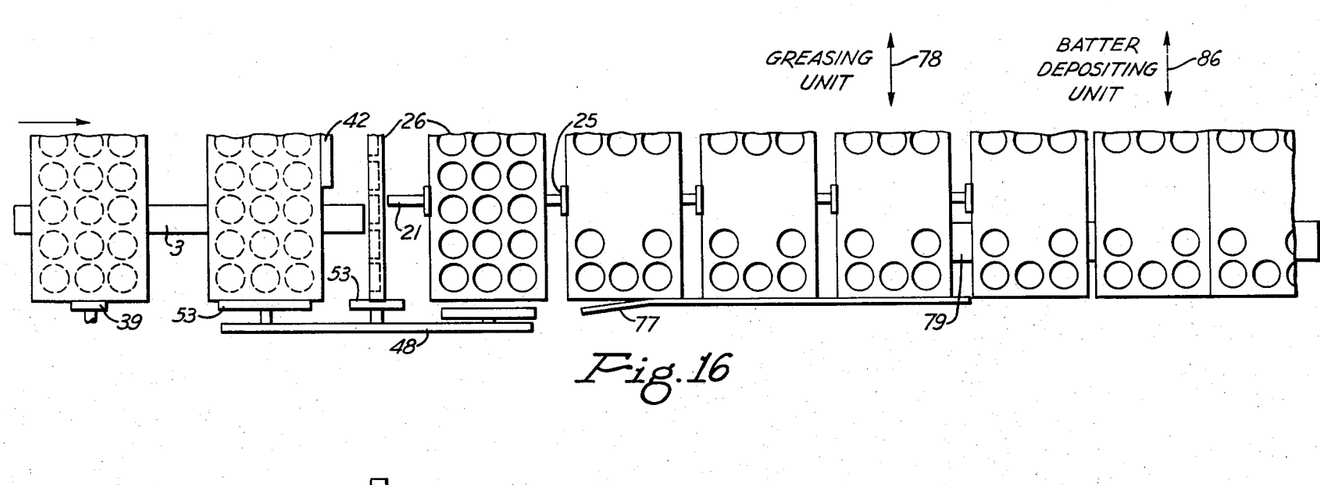
FIG. 16 is a fragmentary diagrammatic view of pans passing through the machine.
Figure 17:
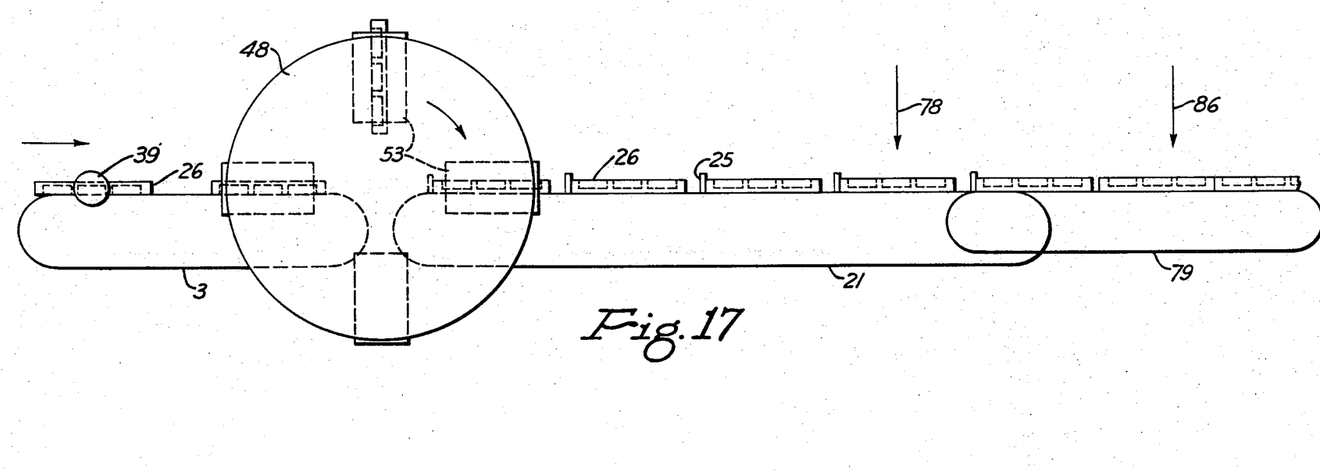
FIG. 17 is a side view of the pans and conveyors shown in FIG. 16.

In order to turn the pan that is against stop 42 right side up and transfer it from the rear conveyor to the second conveyor, a rotating pan turnover mechanism is provided. This includes a rotatable shaft 43 midway between the two conveyors described thus far and near the level of their upper surfaces. The shaft is mounted in bearings 44 on the sidewalls of the machine and is driven continuously from the rear gear box 8 by a chain and sprocket drive 45. Cam 40 is mounted on this shaft. Also mounted on shaft 43 are two laterally spaced circular disks 47 and 48 that are threaded on the shaft in such a way that by turning it by means of a handwheel 49 on one end the disks can be adjusted toward and away from each other as required by the width of the pans going through the machine. Referring more particularly to FIGS. 6, 7 and 8, there are mounted on the outer surface of each disk near its periphery four equally spaced cylinders 51. The piston rods of these cylinders extend through the disks and support rectangular plates 52, to the inner surfaces of which resilient pads 53 are secured. Fluid pressure is supplied to the outer ends of a pair of opposite cylinders when they are opposite the ends of a pan engaging stop 42 to move their pads into engagement with the ends of that pan, whereby it will be clamped between them and lifted from the conveyor and turned over as it is being carried in an arcuate path from one conveyor to the other as shown in FIGS. 16 and 17. Just before the pan, now right side up, reaches the second conveyor, the two cylinders just mentioned are reversed so that their pads will release the pan to permit it to be carried forward by conveyor chains 25. As this pan was lifted from the rear conveyor and before the released following pan reached stop 42, the first pan released a depressed air switch trigger 54 below it to reset the air circuit for cylinders 38 so that the pan following the second pan will be clamped by them when it strikes trigger 37. The second pan is lifted from the conveyor by the next pair of pads 53 carried by the two disks, and so on as each successive pair of pads move into position beside a pan engaging stop 42.

In order to operate the cylinders 51 on these disks, the opposite ends of the cylinders are connected by hoses 56 to valves 57 mounted on a plate 58 rigidly connected to a circular hub 59 secured to the outer face of disk 48. Two of these valves are also connected by hoses 61 with passages in the hub that open into the adjacent ends of a pair of hollow shafts 62 adjacent to and parallel to the main shaft 43 and mounted at their opposite end in a hub 63 on the center shaft at the other side of the machine. The other two valves are connected by hoses 64 with passages in the front two valves that lead to hoses 61. Air under pressure is delivered through a pipe 65 to one end of the hollow main shaft that has radial openings at its center connecting it with an encircling manifold 66, which in turn is connected by tubes 67 with the hollow shafts. Further hoses 68 connect air under pressure from the valves to passages in the hub 59 leading to eight tubes 69 connected with similar passages in the other hub 63. Each of those passages is connected through hoses with the cylinders on the adjoining disk 47 so that valves 57 control the cylinders at both ends of the turnover mechanism simultaneously.

Each of the valves is provided with an actuating member consisting of a sliding bar 72, on the opposite ends of which rollers 73 are mounted. These bars are disposed radially of the disks. When a bar is in its outer position, air is delivered to the outer ends of the pair of cylinders beside the pan engaging stop 42. When the bar is moved inwardly, air is delivered to the inner ends of those cylinders to reverse them. The bars are moved back and forth by cams 74 and 75 mounted on the inside of the adjacent side wall of the frame in positions to be engaged by the inner and outer rollers as the valves pass them. The action of the valves causes the pads to grip and release the pans.

As the pans are carried forward on the second or middle conveyor, they pass between laterally adjustable guide bars 77 beneath a pan greasing unit 78 where grease is sprayed into the pan recesses. Before they leave the conveyor they are pushed by it onto the rear end of a third or front conveyor formed from parallel endless chain link belts 79 extending around sprockets 80 on a rear shaft 81 behind the front shaft of the middle conveyor, and on a front shaft 82 at the front end of the frame. This conveyor is driven continuously by a chain and sprocket drive 84 from a variable speed unit 85 and is used for conveying the greased pans beneath a unit 86 that deposits a measured amount of batter in each of the pan cavities. From the front end of the machine the pans are conveyed away in any suitable manner to an oven for baking.

The greasing unit 78 rests on top of the wide walls of the frame and extends across it like a bridge. It includes a large housing 87, in the ends of which there are a number of controls. Between the ends there is a tank 88 (FIG. 14) for a suitable depanning grease. This grease is electrically heated to reduce its viscosity and is constantly agitated or stirred by an agitator 89 driven in any suitable manner. The grease leaves the bottom of the tank and is pumped under pressure into a manifold pipe 92 extending transversely of the machine beneath the tank. The pump consists of a pair of air cylinders 93 and 94, in each of which there is a piston 95 that reciprocates a pump plunger 96 vertically. When the plunger in cylinder 93 is moved upwardly, grease is drawn into that cylinder from the tank, and when the plunger is moved down it is forced into the other cylinder. When the plunger in cylinder 94 is moved down it forces the grease into the manifold.

Figure 9:
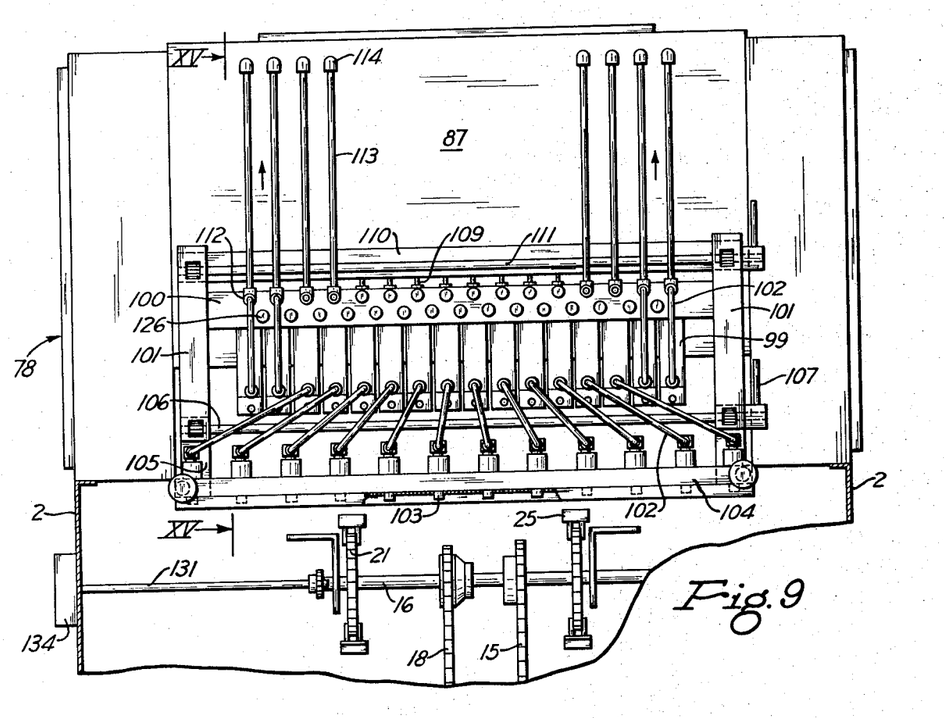
FIG. 9 is an enlarged vertical cross section taken on the line IX—IX of FIG. 1.
Figures 14, 15:
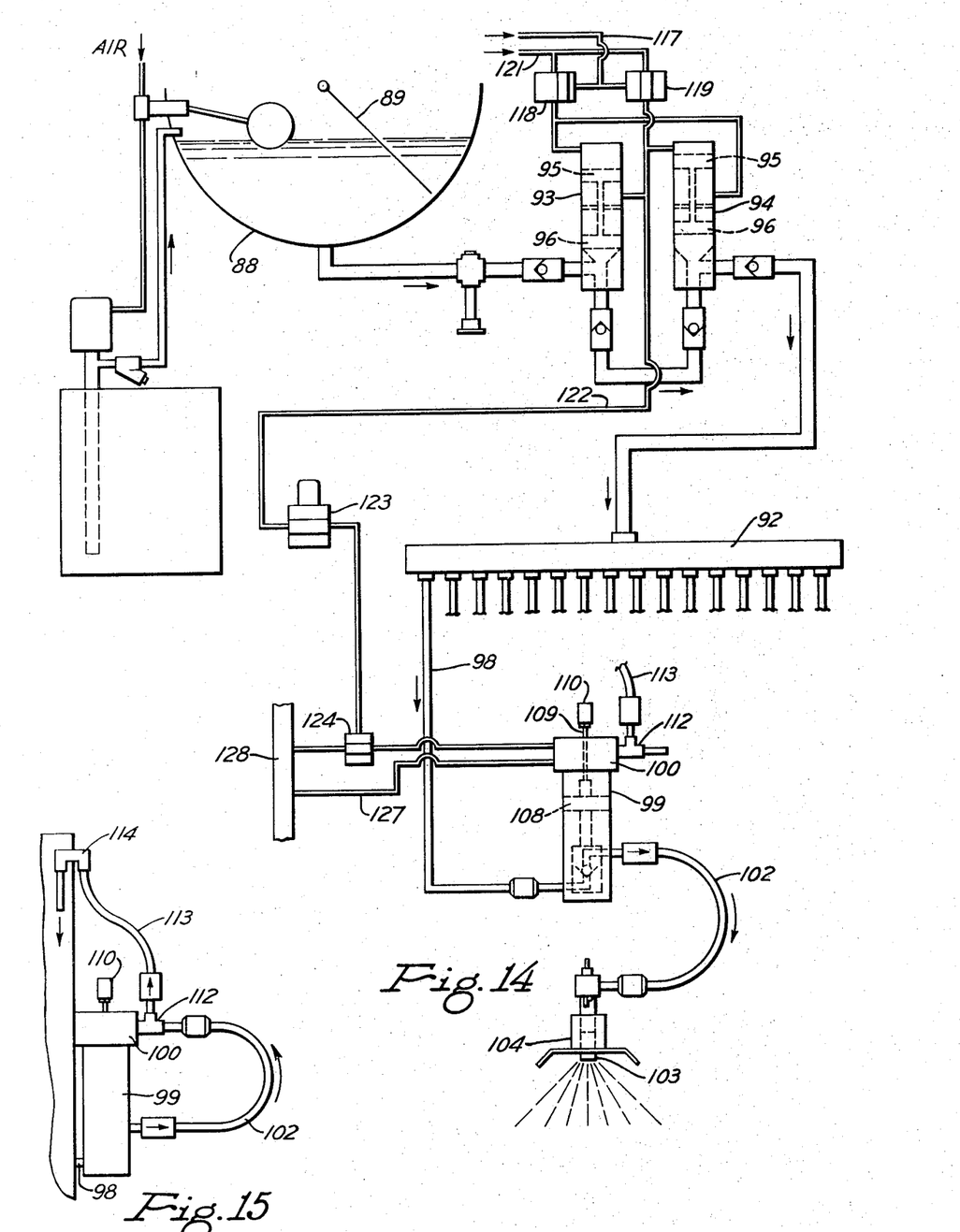
FIG. 14 is a schematic view of the greasing system.
FIG. 15 is a view taken on the line XV—XV of FIG. 9.

The manifold is connected by a large number of tubes 98 to the lower ends of an equal number of metering pumps 99, shown in FIGS. 9, 14 and 15, disposed in front of housing 87. The upper ends of these pumps are mounted in a cross bar 100 supported at its opposite ends by posts 101 secured to the front of the housing. Each pump is designed to receive a predetermined amount of grease from manifold 92 and then discharge it through a flexible hose 102 and a spray nozzle 103 downwardly into a cavity in a pan below it. The nozzles are supported by a bar 104, the ends of which are supported by rack tooth slides 105 that can be adjusted vertically in posts 101 by turning a gear shaft 106 by its handle 107. The charge that each pump 99 receives is determined by the distance that the plunger 108 therein can rise when main pump cylinder 94 forces grease into it, and this is controlled by a rod 109 projecting from the top of the pump and through bar 100 into engagement with a bar 110 adjustable vertically by a rotatable gear shaft 111 journaled at its ends in the posts and rotatable by a handle at one end. The farther the rods are allowed to rise, the larger the charge that the pumps can receive and then deliver when air pressure is applied above plungers 108 (FIG. 14) in the pump cylinders.

Since the number of cavities in a row in a pan varies with the length of the pan, there are times when one or more pumps 99 at each end of the row of pumps will not be used. To merely turn off these pumps in some way would permit the grease to solidify in them, or solids in the grease to settle. Therefore, when a pump is not to be used the hose 102 that connects it with an underlying nozzle is disconnected from the nozzle and connected with a fitting 112 projecting from cross bar 100. This fitting is in turn connected by a tube 113 with a fitting 114 that returns the grease to the tank. Therefore, all of the pumps will continue to operate but some of them will deliver their charges back to the tank instead of to the spray nozzles.

The greasing unit is designed so that grease is sprayed from the nozzles only when a row of pan cavities is directly beneath the nozzles. Between rows and between pans there is no spraying. If a pan is missing, grease will not be sprayed into the space between the pans. Therefore, no grease is wasted and none is sprayed onto the machine or its surroundings. All of the sprayed grease coats only the walls of the pan cavities and nothing else.

Figure 2:
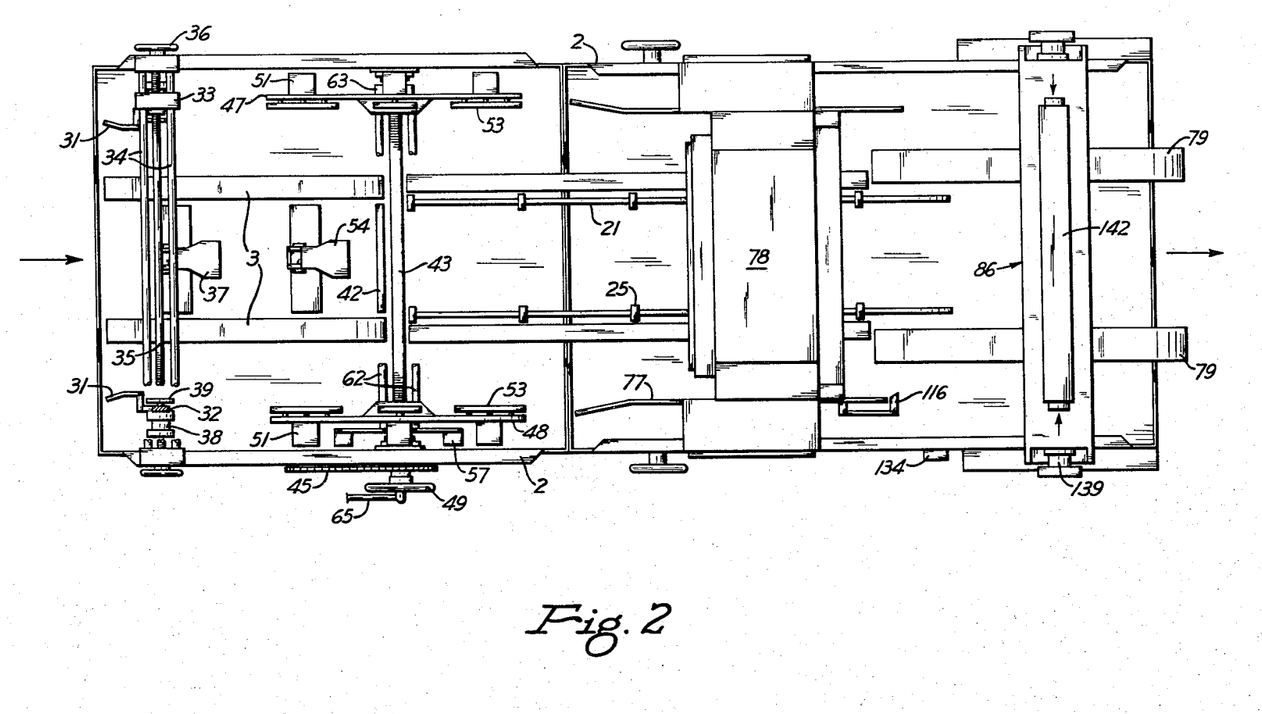
FIG. 2 is a plan view.
Figure 3:
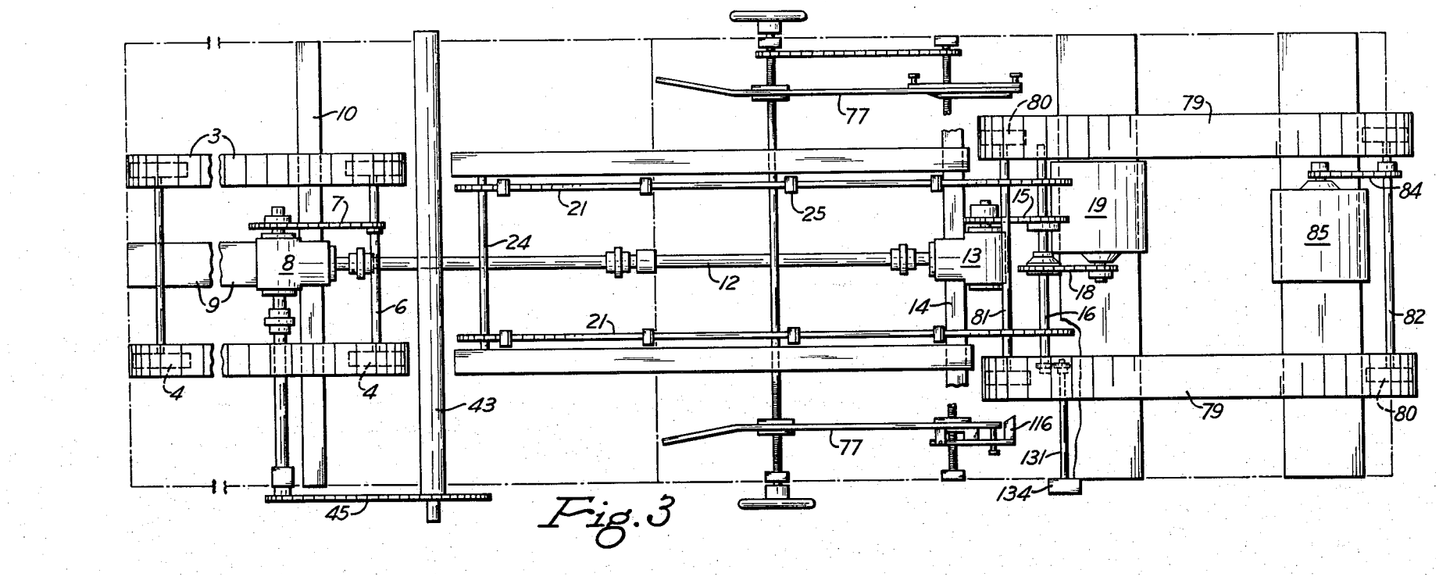
FIG. 3 is an enlarged plan view of mechanism below that seen in FIG. 2.
Figure 4:
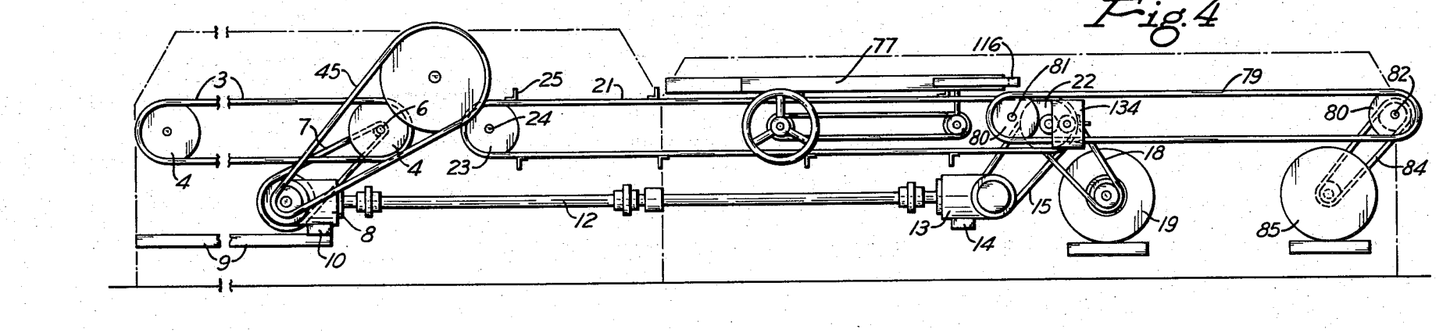
FIG. 4 is a longitudinal vertical section.

As shown in FIGS. 2, 3 and 4, the starting and stopping of the greasing is controlled by a valve trigger 116 mounted on the front end of one of the pan guides 77 in a position to be engaged and actuated by a front corner of a pan passing it, to start the greasing cycle by pressurizing a pilot air line 117 leading to normally open pilot valve 118 and normally closed pilot valve 119 as shown in FIG. 14. Before that, while valve 118 is open, air pressure in a line 121 holds the piston in cylinder 93 down and the piston in cylinder 94 up. Pressurizing line 117 reverses the pilot valves so that the air pressure from line 121 now raises the piston in cylinder 93 to draw in a supply of grease, and forces the piston in the other cylinder down to put the grease in manifold 92 under pressure to charge the metering pumps. Opening of pilot-operated valve 119 also connects line 121 to a line 122 containing a normally closed solenoid valve 123 that controls a normally closed pilot valve 124 connected with normally closed three-way valves 126 (FIG. 9) inserted in bar 100; one valve for each pump. Valves 126 are designed to connect the upper ends of the metering pumps with exhaust, and through a line 127, with the main air pressure supply 128. This air pressure is on valves 126 at all times so that there will be no delay in operating the metering pumps when pilot valve 124 is opened to cause valves 126 to admit air pressure to the upper ends of the metering pump cylinders. Pilot valve 124 is opened whenever solenoid valve 123 is opened to deliver air pressure to the pilot valve.

Figure 11:
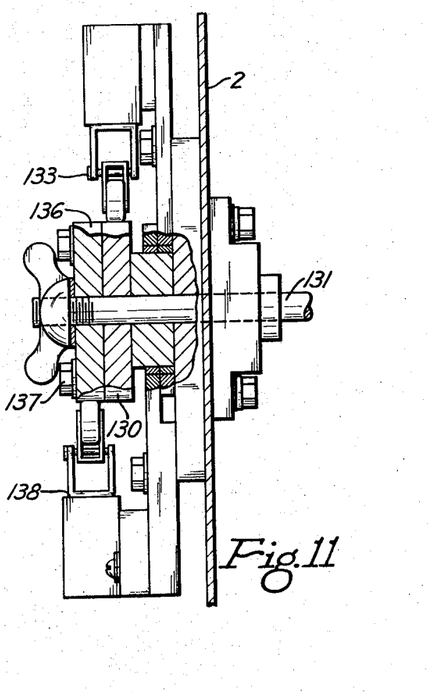
FIG. 11 is a view taken approximately on the line XI—XI of FIG. 10.

The intermittent spraying from the nozzles during each greasing period or cycle is controlled by a cam 130 shown in FIG. 11, driven by a shaft 131 rotated by the front shaft 16 of the middle conveyor. This cam is provided with projecting members 132 that close an electric switch 133 every time a row of pan cavities is in greasing position. The switch opens solenoid valve 123, so pilot valve 124 and valves 126 open to admit air pressure from line 127 to the metering pumps, where the air pressure forces pump plungers 108 down to spray grease from the nozzles. Between normally spaced pans the cam does not close the switch, so there is no spraying between pans. The cam and switch are housed in a box 134 on the outside of one of the machine sidewalls. As soon as the pan leaves the trigger, greasing is discontinued by exhausting line 117, which reverses pilot valves 118 and 119 and thereby takes the pressure off the grease in manifold 92 and recharges cylinder 94.

Figure 10:
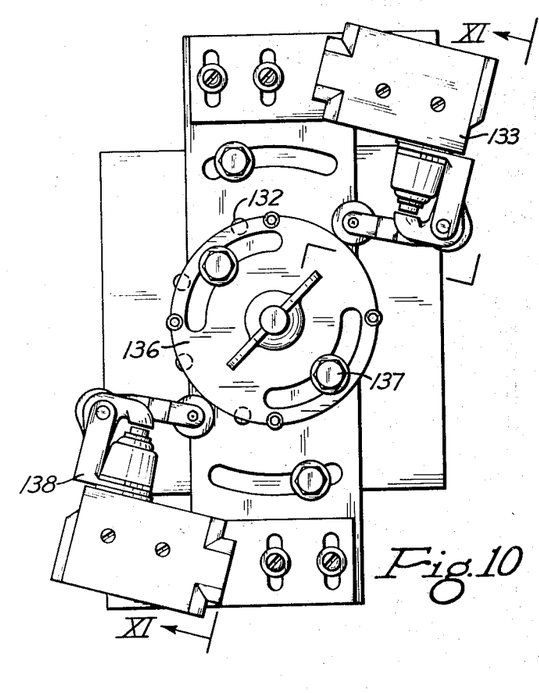
FIG. 10 is a further enlarged side view of the cams controlling greasing and batter depositing.
Figures 12, 13:
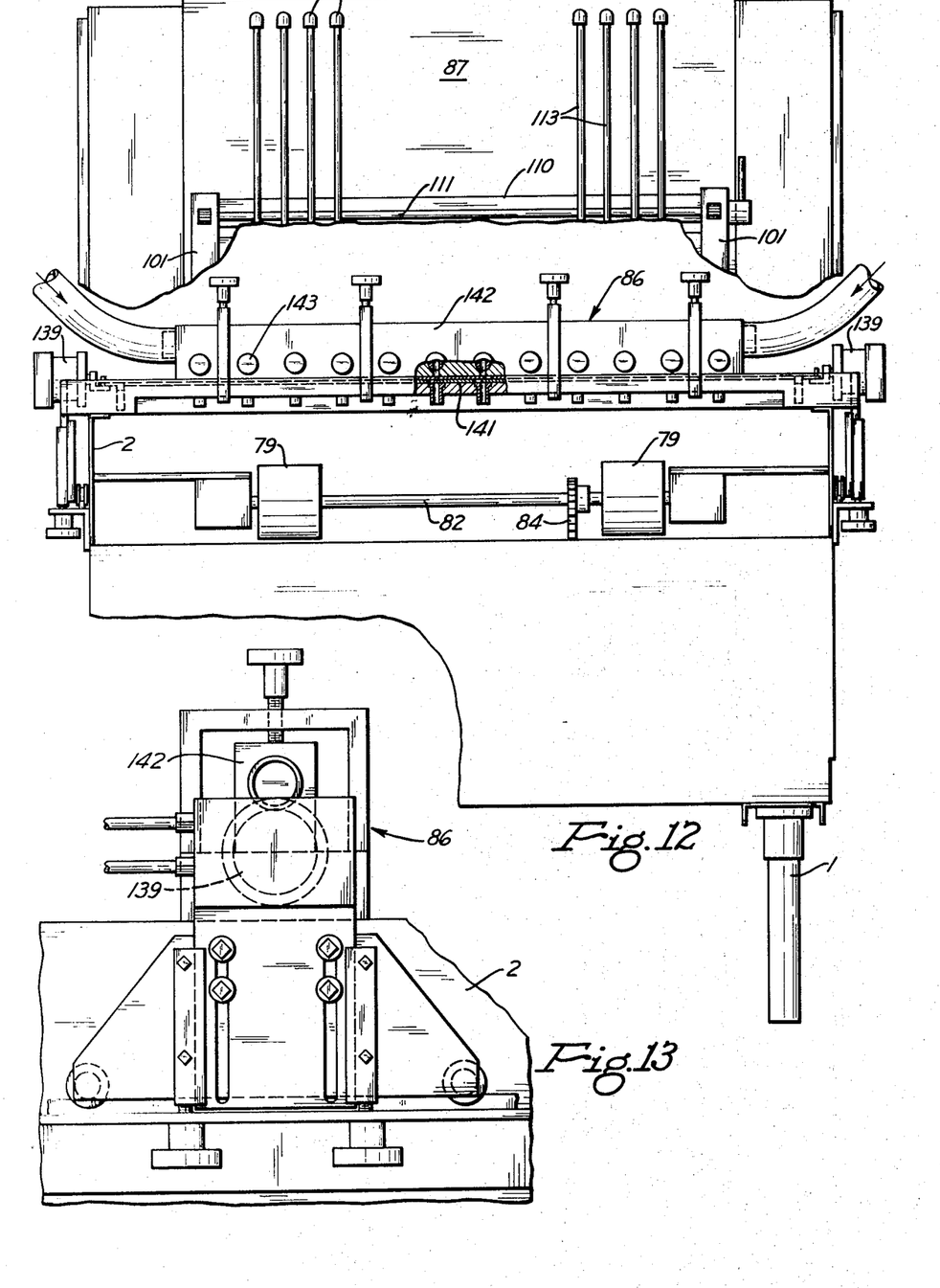
FIG. 12 is a view of the exit end of the machine.
FIG. 13 is an end view of the batter depositor.

The pans on the middle conveyor are spaced apart by the flight bars, but when they reach the front conveyor, which is run at a slower speed, they engage one another in a continuous line as shown in FIGS. 16 and 17. As the pans pass under the batter depositing unit 86, uniform charges of batter are deposited in each row of recesses. This depositing is controlled by a cam 136 likewise driven by shaft 131 and adjustably connected to the other cam 130 by screws 137 as shown in FIGS. 10 and 11. This second cam closes an electric switch 138 at regular intervals to operate a timer that opens valves to supply air pressure to the outer ends of air cylinders 139 at the opposite ends of the depositing unit shown in FIGS. 12 and 13. These cylinders are connected with superimposed slide valves 141 in the bottom of a vertically and horizontally adjustable manifold 142. Batter is supplied from a suitable source to the opposite ends of this manifold to maintain it full. The manifold is provided with a plurality of longitudinally spaced rotatable valve members 143 that have diametric openings therethrough. By turning these valves, the amount of batter that can pass through them while the slide valves are open can be controlled.

The two slide valves are provided with openings that normally are offset so that batter cannot escape from the manifold. When air pressure is applied in the outer ends of the cylinders, the slide valves are moved lengthwise to cause their openings to register and allow batter to pass through them and drop into the pan cavities below them. The length of time the valves are open depends upon the timer setting. When the timer times out the air supply to the cylinders is reversed and the slide valves are closed. The operation of the slide valves is at regular intervals, so in order to compensate for the greater distance between the last row of cavities in a pan and the first row in the next pan, the flight bars on the middle conveyor, which move faster than the front conveyor belts, slide the pans ahead on the front conveyor at just the right moment for the first row of cavities in a pan to receive batter.

It will be seen that the machine disclosed herein is entirely automatic. It takes the washed empty pans, turns them right side up, greases their cavities and then deposits batter in the greased cavities ready for baking. The machine is fully adjustable for speed, size of pans, amount of greasing and size of batter deposit. It is a clean machine because grease is not sprayed on anything except the walls of the pan cavities. This feature also economizes on grease.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A bakery machine comprising a pair of laterally spaced members rotatable continuously in parallel vertical planes on a common horizontal axis, a plurality of clamping pads mounted on each of said members in uniform circumferentially spaced relation, the pads on each rotatable member facing the pads on the other member to form cooperating pairs of pads, the rotatable members carrying each successive pair of pads upwardly at one side of said axis and downwardly at the opposite side, a support for an inverted multi-cavity bakery pan between said rotatable members at said one side, a conveyor between said members at said opposite side for carrying pans forward away from said members, actuating means carried by said rotatable members for moving the pads of each pair inwardly toward each other when they are beside said support to thereby clamp them against opposite edges of a pan on the support to lift the clamped pan and carry it forward and then downward for deposit right side up on said conveyor, means for retracting the pads from the pan as it reaches the conveyor, a row of downwardly directed spray nozzles extending transversely of the machine above said conveyor in front of said rotatable members, a metering pump connected with each nozzle, means for supplying depanning grease to each pump, and means for operating said pumps at predetermined intervals to spray a predetermined amount of grease into pan cavities as said conveyor carries a pan forward beneath said nozzles.

2. A bakery machine according to claim 1, said operating means including a fluid pressure line connected with said pumps for forcing grease out of said nozzles, valve means normally closing said line, a continuously rotating cam for periodically operating said valve means to open said line, and means actuated by each pan in succession on said conveyor for operating said grease supplying means.

3. A bakery machine according to claim 2, including means operative in the absence of a pan in a predetermined location on said conveyor for rendering operation of said valve means ineffective.

4. A bakery machine according to claim 1, including a flexible hose connected to the outlet of each pump and detachably connected to a nozzle, and conduits for detachable connection to the outlets of some of said hoses when they are disconnected from nozzles to return grease from the pumps to said grease supplying means.

5. A bakery machine according to claim 1, including a row of downwardly directed depositing spouts extending transversely of the machine in front of said spray nozzles, means for carrying greased pans forward beneath said spouts, valves normally closing the depositing spouts, means for periodically opening said valves, and means for ejecting batter from the open spouts into the greased pan cavities.

6. A bakery machine according to claim 5, in which said valves are a pair of superimposed strips provided with normally offset openings therethrough, and said valve-opening means include fluid pressure cylinders connected with one end of each strip for moving the strips lengthwise in opposite directions to register their openings with the upper ends of said spouts.

7. A bakery machine according to claim 1, including a row of downwardly directed depositing spouts extending transversely of the machine in front of said spray nozzles, and a front conveyor for receiving greased pans from said first-mentioned conveyor and carrying them forward beneath said spouts, the speed of the front conveyor being such that the pans thereon engage one another, and the two conveyors being overlapped to cause a pan leaving the first-mentioned conveyor to slide the pans ahead of it forward on the front conveyor far enough for the front row of cavities in each successive pan to be positioned below said spouts when batter is ejected from them.

8. A bakery machine comprising a conveyor for carrying longitudinally spaced multi-cavity bakery pans forward, a row of downwardly directed spray nozzles above the conveyor and extending transversely of it, a metering pump connected with each nozzle, means for supplying depanning grease to each pump, a fluid pressure line connected with said pumps for forcing grease out of said nozzles, valve means normally closing said line, a continuously rotating cam for periodically operating said valve means to open said line, and pan-engaging means actuated by each pan in succession on said conveyor for operating said grease supplying means to refill said pumps before each time said valve means is operated.

9. A bakery machine according to claim 8, in which said grease-supplying means include a main pump, conduit means connecting the main pump with said metering pumps, and fluid pressure means operated by said pan-engaging means for operating the main pump.

10. A bakery machine according to claim 9, in which said main pump includes a plunger for forcing grease through said conduit means and into said metering pumps, and said fluid pressure means exerts continuous pressure on said plunger as long as said pan-engaging means engages a pan.

* * * * *